United States Patent [19]

Cullen

[11] 4,344,713
[45] Aug. 17, 1982

[54] CHARACTER OVERPRINTING METHOD AND APPARATUS IN NON-IMPACT PRINTERS

[75] Inventor: James H. Cullen, Bensalem, Pa.

[73] Assignee: Sperry Corporation, New York, N.Y.

[21] Appl. No.: 167,071

[22] Filed: Jul. 9, 1980

[51] Int. Cl.³ .................................................. B41G 3/00
[52] U.S. Cl. .............................. 400/22; 101/DIG. 13; 400/300; 355/3 R
[58] Field of Search ................. 101/DIG. 13; 400/22, 400/300, 301; 355/26, 3 R, 75

[56] References Cited

U.S. PATENT DOCUMENTS

| | | | |
|---|---|---|---|
| 3,615,131 | 10/1971 | Sable et al. ............................. | 355/14 |
| 3,800,303 | 3/1974 | Picquenllar et al. ... | 101/DIG. 13 X |
| 3,917,400 | 11/1975 | Rodek et al. ............................. | 355/50 |
| 3,972,612 | 8/1976 | Komosi et al. ......................... | 355/26 |
| 4,050,806 | 9/1977 | Mayakawa et al. .... | 101/DIG. 13 X |
| 4,129,075 | 12/1978 | Okabe ................................... | 400/22 |
| 4,167,324 | 9/1979 | Wu ........................................ | 355/3 R |

FOREIGN PATENT DOCUMENTS

55-38527  7/1980  Japan ................................. 355/3 R

*Primary Examiner*—Edward M. Coven
*Attorney, Agent, or Firm*—Robert E. Lee, Jr.; Kenneth Grace; Marshall M. Truex

[57] ABSTRACT

A character overprinting apparatus and method for overprinting in a laser non-impact printer is disclosed. Control bits are generated and assigned to data words transmitted from a host system. An underline control bit identifies whether the associated data word will require underlining and a data control bit identifies the data word as a character space or a character shape. An intermediate storage register stores a line of data words and associated control bits for overprinting. Stored data words and associated control bits from the intermediate storage register and data words and associated control bits from the host system are compared in an overprinting circuitry means to effect a selected merger of the data words and a selected modification of the control bits. The merger and modification are done in accordance with a pre-selected set of overprint rules. The merged data words and modified control bits are transmitted to the intermediate storage register, where they await further overprinting in the overprinting circuitry means or from where the data words are transmitted to a character generator memory in the laser printer to select character shapes stored therein for printing by the printing means of the laser printer. At the same time, the modified underline control bit stored in the intermediate storage register and associated with stored data words are transmitted to the printing means, whereby selected character shapes are underlined when printed.

5 Claims, 7 Drawing Figures

| U | S | HOST CONTROL BITS — MEANING |
|---|---|---|
| 0 | 0 | NO UNDERLINING / CHARACTER SHAPE |
| 0 | 1 | NO UNDERLINING / CHARACTER SPACE |
| 1 | 0 | UNDERLINING / CHARACTER SHAPE OR SPACE |
| 1 | 1 | NOT VALID |

*Fig. 5*

| U | S | STORED CONTROL BITS — MEANING |
|---|---|---|
| 0 | 0 | NO UNDERLINING / CHARACTER SHAPE |
| 0 | 1 | NO UNDERLINING / CHARACTER SPACE |
| 1 | 0 | UNDERLINING / CHARACTER SHAPE |
| 1 | 1 | UNDERLINING / CHARACTER SPACE |

*Fig. 6*

| STORED CONTROL BIT CODE / HOST CONTROL BIT CODE | COLUMN 1<br>U,S = 00<br>DATA CODE | COLUMN 2<br>U,S = 01<br>SPACE CODE | COLUMN 3<br>U,S = 10<br>UNDERLINE CODE | COLUMN 4<br>U,S = 11<br>UNDERLINE CODE |
|---|---|---|---|---|
| ROW 1<br>U,S = 00<br>DATA CODE | DATA WORDS EQUAL/INVALID; DATA WORDS NOT EQUAL/NO CHANGE | CLEAR S-BIT ACTIVATE MERGE SIGNAL | DATA WORDS EQUAL/INVALID; DATA WORDS NOT EQUAL/NO CHANGE | CLEAR S-BIT ACTIVATE MERGE SIGNAL |
| ROW 2<br>U,S = 01<br>SPACE CODE | NO CHANGE ─────────────────────────────────────────────→ | | | |
| ROW 3<br>U,S = 10<br>UNDERLINE CODE | SET U-BIT DEACTIVATE MERGE SIGNAL ───────────────────────→ | | | |
| ROW 4<br>U,S = 11<br>INVALID CODE | INVALID ─────────────────────────────────────────────────→ | | | |

*Fig. 7*

CHARACTER OVERPRINTING METHOD AND APPARATUS IN NON-IMPACT PRINTERS

BACKGROUND OF THE INVENTION

This invention relates to character overprinting in non-impact laser printers. Character overprinting includes but is not limited to character underlining.

Impact printers are often used as output devices for host computer systems. The host system transmits lines of data to the printer along with commands for each line to operate the printer. For each line of print, separate commands are available to print the line and advance the paper or to print the line without advancing the paper. If it is desired to underline selected characters in a line of character shapes, the line of character shapes is first transmitted along with a command to print without advancing the paper. The next line of data identifies which characters are to be overprinted with underlining, and it is accompanied by a command to print the underlining and then advance the paper. In impact printers, the ability to separately control the advance of paper and the printing of data for each line of data provides a capability for character overprinting.

Character overprinting as described above is impossible in high speed laser non-impact printers since the operations of printing and advance of the paper are not independent. In a typical laser non-impact printer, a periodically sweeping laser beam, in response to modulation signals from a character generator, images many parallel lines of data onto a continuously rotating cylindrical photoconducting drum. The images are developed on the drum as the drum rotates. When the drum rotates past a transfer station with the developed images thereon, the images are transferred onto a continuously moving sheet of paper which passes in close proximity to the surface of the drum. The paper is then discharged.

The host system transmits data with commands to a non-impact printer in much the same way as with an impact printer except that character overprinting such as underlining is difficult to attain for the reason mentioned above. One manner of accomplishing underlining would be to provide two sets of identical characters stored in a character generator memory, one with underlining. However, such an approach would require twice as much memory space in the character generator memory just to attain character underlining.

SUMMARY OF THE INVENTION

The present invention comprises a method and apparatus for providing character overprinting in a laser non-impact printer. Each line of data from a host computer system which is to be printed comprises a plurality of data words, each data word representing a character shape or space to be printed, or identifies which character positions in a previous or subsequent line of data require underlining. The data words of a line of data are transmitted serially to a translate table portion of the laser printer where, in response to the data in each data word, a character bit code is assigned. In the preferred embodiment, a data portion of the character bit code identifies the data word as a character shape or a character space and an underscore portion of the code designates whether the associated data word of a previous line of data requires underlining. A line of data words and associated character bit codes from the translate table (host line) and a line of data words and associated control bit codes from an intermediate storage means (stored line) are merged in an overprinting circuitry portion of the system to provide an "overprinted" line of data words and associated control bit codes which are transmitted therefrom and once again stored in the intermediate storage means.

Each host line of data is accompanied by at least one command from the host system. The command tells the intermediate storage means if the line stored therein is ready for printing by providing a print with advance command. If further overprinting is required, a print with no advance command is issued and the stored line of data is transmitted to the overprinting circuitry simultaneously with a host line of related data. The host line of related data is merged with the stored line of data according to a predetermined set of overprint rules. Now, the merged line may or may not be in such form as to be printed depending on how much overprinting is required.

Where a first line of character shapes with no underlining is stored in the intermediate storage means and it is desired to underline selected character shapes or spaces in that line, a second line of related data will be sent from the host system with appropriate control bit codes. Since only underlining is required, the data words of the second line will only identify which character positions in the first line will require underlining and the control bit codes assigned to the appropriate words of the second line by the translate table will so indicate. In the overprinting circuitry, the control bit codes of the data words brought from the intermediate storage means which are to be underlined will be modified to enable the words when printed to be underlined. The overprinting circuitry then transmits the data words to be underlined along with the modified control bit codes to the intermediate storage means once again. Other forms of overprinting besides underlining are possible. For example, a first line of data representing character shapes (fixed data) might contain blank spaces to be filled in from a second line of data (variable data). The two lines of data may also represent different styles of print.

When the data words are modified to indicate underlined words, a command from the host system, via line 24 to the microprocessor controller 26 of the laser printer, signals the intermediate storage means via line 40 to forward the data word to be overprinted to the character generator memory where they will select a line of character shapes for printing. The underscored portions of the control bit codes in the intermediate storage means are forwarded along with the words to the printing means where underlining of selected character shapes, transmitted from the character generator, is effected.

It is an advantage of the present invention to provide character overprinting capability in laser non-impact printers.

Another advantage of the present invention is to provide character overprinting capability in laser non-impact printers which is compatible with existing host software systems for operating impact printers.

Other objects, features and advantages of the present invention will become more fully apparent from the following detailed description of the preferred embodiment, the appended claims and the accompanying drawings, in which:

DETAILED DESCRIPTION OF THE DRAWINGS

Figure 1:
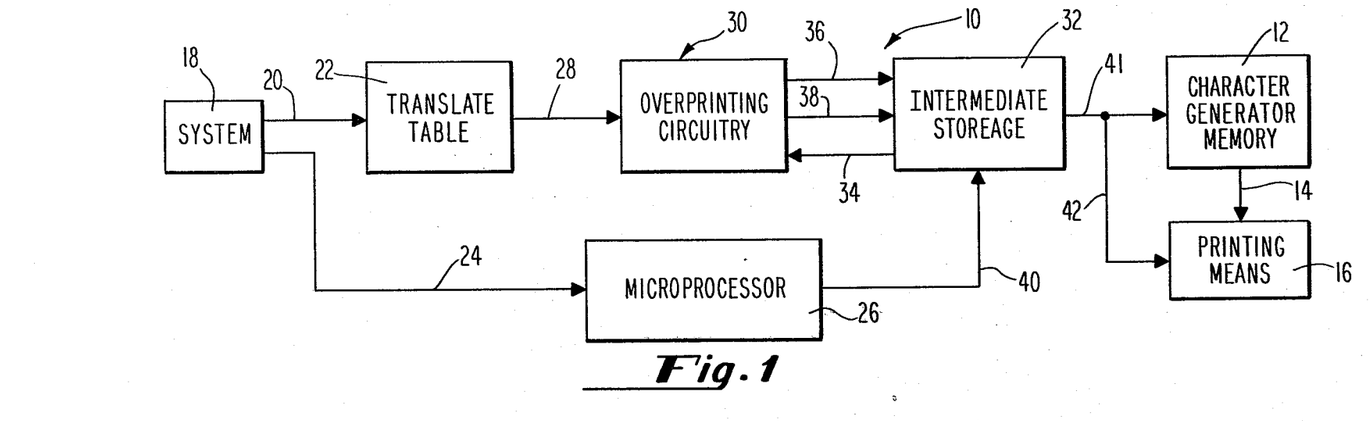
FIG. 1 is a block diagram of the present embodiment laser printer with overprinting capability.

Referring to the drawings, FIG. 1 is a block diagram designated generally 10 of a laser non-impact printer having an overprinting capability. The laser printer comprises a character generator memory 12 and a printing means 16 connected to the character generator 12 via line 14. Character generator memory 12 stores a plurality of character shapes as a plurality of matrices of binary ones and zeroes and each character shape has a starting address associated therewith. When a line of character shapes is to be printed, the patterns of binary ones and zeroes are transmitted via line 14 to the printing means 16.

Figure 4:
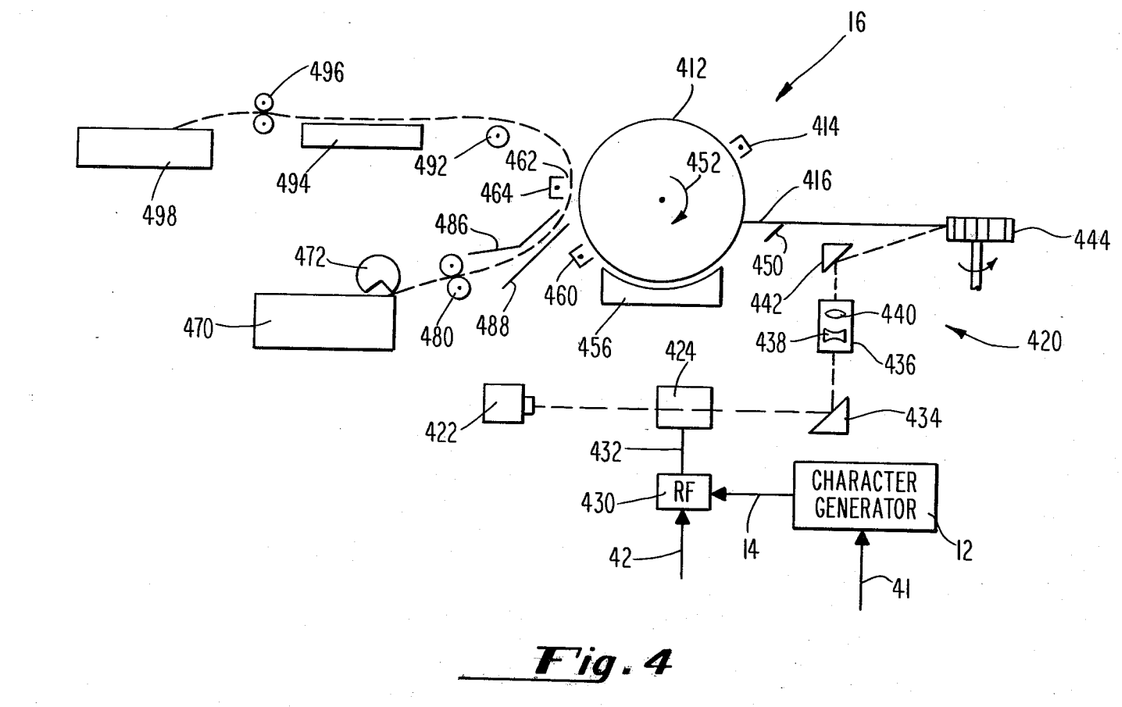
FIG. 4 is a block diagram of a non-impact laser printer.

Printing means 16 is shown in more detail in FIG. 4. The printing means comprises many of the components of a conventional plain paper copying machine. As an example, one such plain paper copier suitable for use in the preferred embodiment of the present invention is disclosed in U.S. Pat. No. 3,972,612, which is incorporated by reference as if specifically set forth herein. Other plain paper copiers varying in detail but comprising the essential components of a plain paper copier are also suitable for use in the preferred embodiment of the present invention.

In general, the printing means comprises a photosensitive member such as the rotatable cylindrical photoconducting drum 412. In the example of FIG. 4, a corotron 414 produces an electric charge on photoconducting drum 412 as it rotates thereby. That portion of the photoconducting drum 412 passing by the exposure station 416 is illuminated along a line by a light source.

In the preferred embodiment laser printer, exposure of the photoconducting drum is provided by a scanning laser system designated generally 420. Wherever the light beam of the scanning laser beam impinges the photoconducting drum, the drum is discharged leaving an image thereon. The scanning laser system 420 comprises a laser light source 422 which transmits a collimated light beam to a light beam modulator 424. Signals which designate data bits, ones or zeroes, from the character generator 12 and which represent portions of alphanumeric characters to be printed by the printing means 16 are sequentially transmitted over lines 14 to RF generator 430. If a one-bit signal is transmitted, RF generator 430 transmits an RF voltage over line 432 to light beam modulator 424, otherwise no RF voltage is transmitted.

Light beam modulator 424 acts in response to RF voltages and establishes acoustic vibrations which cause a portion of the collimated light beam to be diffracted through an angle along the deflected path. Together, the deflected portion and the remaining portion form a modulated light beam.

The modulated light beam impinges upon prism 434 where its direction is changed to pass through an optical lens system 436 comprising a negative lens 438 and a positive lens 440. These lenses cooperate together to control the size and focus of the modulated light beam. After passing through the optical system 436 the direction of the modulated light beam is again changed by prism 442 to impinge on rotating polygonal mirror 444 which imparts the sweeping motion to the laser light beam. The rotating reflection mirror 444 reflects the modulated light beam toward photoconducting drum 412 causing it to sweep repeatedly in fan-like fashion. In the preferred embodiment, only the deflected portion of the light beam is enabled to impinge upon the surface of the photoconducting drum 412. When ones stored in the character generator memory are transmitted as high bit signals to RF generator 430, RF pulses are transmitted to light beam modulator 424 which in turn causes the deflected portion of the light beam to be switched on. When this occurs light impinges on a photoconducting drum 412 to discharge it and image a dot thereon. The undeflected portion of the light beam is never permitted to strike photoconducting drum 412. A suitable reflecting mirror 450 is shown schematically in FIG. 4 to reflect the unwanted portion of the modulated light beam away from the photoconducting drum 412.

Photoconducting drum 412 is caused to rotate in a direction of curved line and arrow 452 while the periodically sweeping laser beam traverses a series of parallel straight lines across the surface of the drum. The straight lines are parallel to the axis of the drum and represent lines of data to be imaged on the sheet of paper.

At the exposure station 416, the modulated light beam images data on the photoconducting drum 412 in the form of electrostatic charges. As the portion of the drum with the electrostatic images rotates, it passes by a developing station which comprises a container 456 which contains developing solution having toner therein. The developing solution is pumped on to the photoconducting surface and toner material therein adheres to the electrostatic image formed on the drum to thereby develop the image. In the preferred embodiment, a corotron 460 removes excess developing solution from the photoconductive drum 412 without disturbing the toner image.

Photoconducting drum 412 with the toned image is then rotated past transfer station 462 where the image on the photoconducting drum 412 is transferred to a sheet of paper passing through the transfer station 462, the transfer occurring because of the voltage of the corotron 464. Hence, as a sheet of paper passes by the photoconducting drum 412 at transfer station 462 corotron 464 acts as a transfer means for transferring the data image on the photoconducting drum to one side of the sheet of paper.

Sheets of paper are stored in a paper feeding station 470. A sheet of paper is removed from the paper feeding station by activating a cammed roller 472. As the cam roller 472 rotates the outer circumference portion engages the top sheet of paper in the paper feeding station 470 and moves the paper from the paper feeding station into the pinch roller assembly 480. Pinch roller assembly 480 is in constant rotation and engages the paper to propel it through the channel formed by paper guides 486 and 488. The paper guides guide the paper to the transfer station 462 where, through the action of the corotron 464, the image on the photoconducting drum 412 is transferred continuously to one side of the paper.

The paper leaves the transfer station 462 propelled by roller 492. It is propelled across a heated platen 494 where the toned image is fused to the paper. After leaving the heated platen 494, the sheet follows a discharge path through pinch roller assembly 496. The paper is then deposited in discharge station 498.

Referring once again to FIG. 1, a host system 18 transmits lines of data over cable 20 to a translate table circuit 22 of the laser printer 10. Each line of data consists of a plurality of data words, serially transmitted, each word of data defining a character space or character shape, or identifying which character positions in a previous line stored in the intermediate storage means require underlining. Each data word in the preferred embodiment is transmitted as at least eight parallel bits and cable 20 represents at least eight parallel lines. Translate table 22 functions as an assignment means for assigning control bit codes to each data word depending upon the contents of the data word. In the preferred embodiment, the control bit code comprises two bits. The first bit is the data portion which defines the data word as a character shape or character space, and the second bit is the underscore portion which indicates whether the associated data word requires underlining or not. Hence, eight bit data words entering translate table 22 are transmitted as a line of ten bit words, a data word and an associated two bit control bit code. Translate table 22 may also convert the data word from a computer code for a given character to a data word which is the starting address of the given character shape in character generator memory 12.

Figure 2:
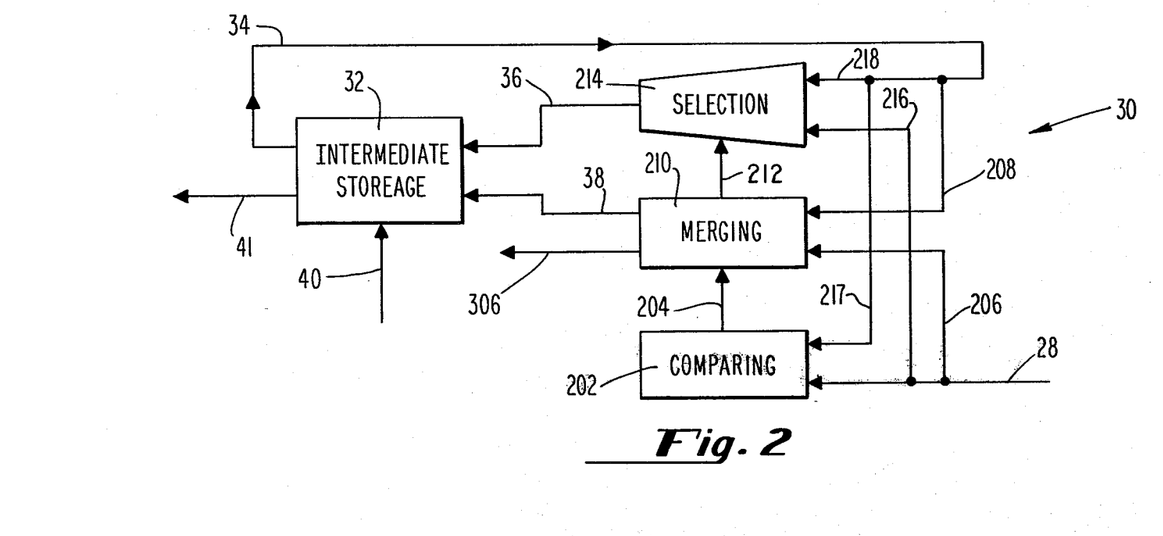
FIG. 2 is a more detailed block diagram of a portion of FIG. 1.

Referring now to FIGS. 1 and 2, translate table 22 transmits the line of data words and associated control bit codes (host line) serially to overprinting circuitry portion designated generally 30. Each data word and associated control bit code (10 bits) is transmitted in parallel over lines represented by cable 28. Simultaneously, a line of data words and associated control bit codes is transmitted to overprinting circuitry 30 over cable 34 from intermediate storage means 32 (stored line). Overprinting circuitry portion 30 compares pairs of data words for equality in a comparator 202, where the pair of data words which is compared represents a data word from each of the two lines, i.e., the host line and the stored line. The sequential position of a data word of a pair, in its respective line, is the same as the sequential position of the other data word forming a pair being compared. Only the data word portions of the transmissions from lines 28 (host data words) and 34 (stored data words) are compared in comparator 202, a 74S85 TTL device. The control bit codes of the pair of data words being compared are transmitted over cables 206 and 208 from cables 28 and 34, respectively, to merging circuitry portion designated generally 210 in FIG. 2. Each control bit code is made up of two bits in the preferred embodiment and is transmitted in parallel in the two line cables 206 and 208. A data equal signal generated in comparator 202 in response to the comparison of each data word pair is also transmitted to merging circuitry portion 210 over line 204. In the preferred embodiment, a high signal is transmitted on line 204 when the data words are equal, otherwise a low signal is transmitted. The data word pair being compared in comparator 202 is simultaneously transmitted to selector 214 over cables 216 and 218 from cables 28 and 34 respectively.

Merging circuitry portion 210 operates on the control bit code pair associated with the data word pair transmitted to comparator 202 and selector 214, and on the data word equal signal from comparator 202 to form a modified control bit code and a merge signal. The foregoing operation occurs in accordance with predetermined overprint rules embodied in the merge control logic shown in FIG. 3 which is to be described later.

The merge control signal from merging circuitry portion 210 is transmitted to selector 214 over line 212. In response to this signal, selector 214 selects one of the data words on cables 216 or 218 for further transmission over cable 36 to the intermediate storage means 32. At the same time, modified control bit codes from merging circuitry portion 210 are transmitted over cable 38 to intermediate storage means 32. In accordance with the overprint rules, if a host data word from cable 28 in a given data word pair is to replace a stored data word from cable 34, then a high merge signal is transmitted from merge control circuitry 210 on line 212 and the data portion of the modified control bit code is modified if appropriate. If the underscore portion of a control bit code associated with either a host data word or a stored data word indicates that underlining of the associated data word is required, then the underscored portion of the modified control bit code will also indicate that underlining is required. In the preferred embodiment, the overprint rules mentioned above are: a data word from the host line representing a non-space character (character shape) with no underlining indicated replaces a data word in a stored line representing a character space; a data word from the host line representing a character space does not replace a data word in the stored line representing a character shape; a data word from the host line representing a character shape does not replace a non-identical data word representing a character shape; and the understood portion of a modified control bit code will indicate underlining if either of the underscore portions of the control bit codes of a data word pair indicate that underlining is required.

Figure 5:
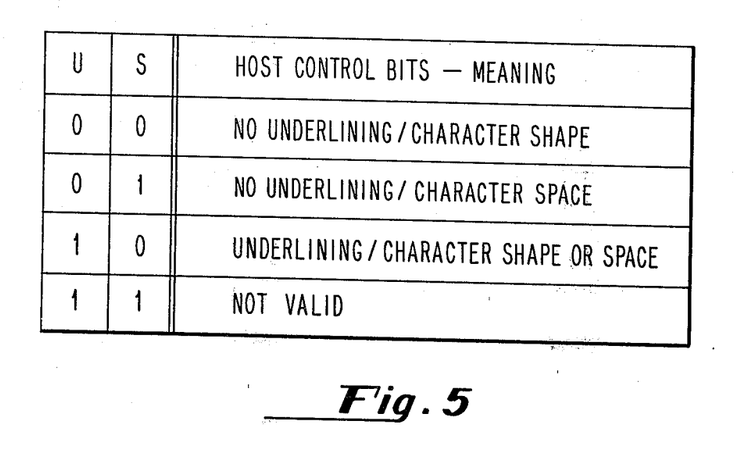
FIG. 5 is a table showing the allowable assignments of control bit codes to data words transmitted from the host system.
Figure 6:
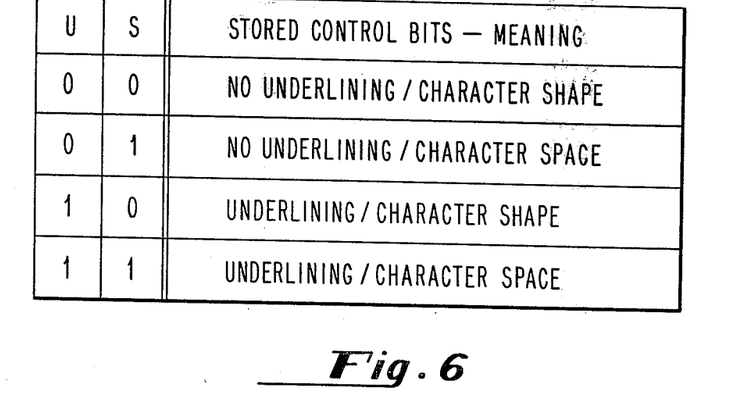
FIG. 6 is a table showing the allowable assignments of control bit codes to data words from the intermediate storage means.

FIG. 5 is a table showing the meaning of allowable control bit codes assigned to host data words; i.e., data words transmitted from the host to translate table 22. FIG. 6 is a table showing the meaning of allowable control bit codes assigned to stored data words; i.e., words stored in the intermediate storage means 32. In both FIGS. 5 and 6, the underscore bit portion is labelled U and the data bit portion S. The control bit codes U=0, S=0 and U=0, S=1 are the same for both FIGS. 5 and 6. U=0 means that the associated data word requires no underlining. A data word representing a character shape is assigned S=0, while for a character space S=1. In FIG. 5, U=1, S=0 means that the associated data word, whether character space or shape, requires underlining. The code U=1, S=1 is invalid for host data words.

In FIG. 6, U=1, S=0 is assigned to stored data words representing character shapes and requiring underlining while U=1, S=1 is assigned to data words representing a character space and requiring underlining.

Figure 3:
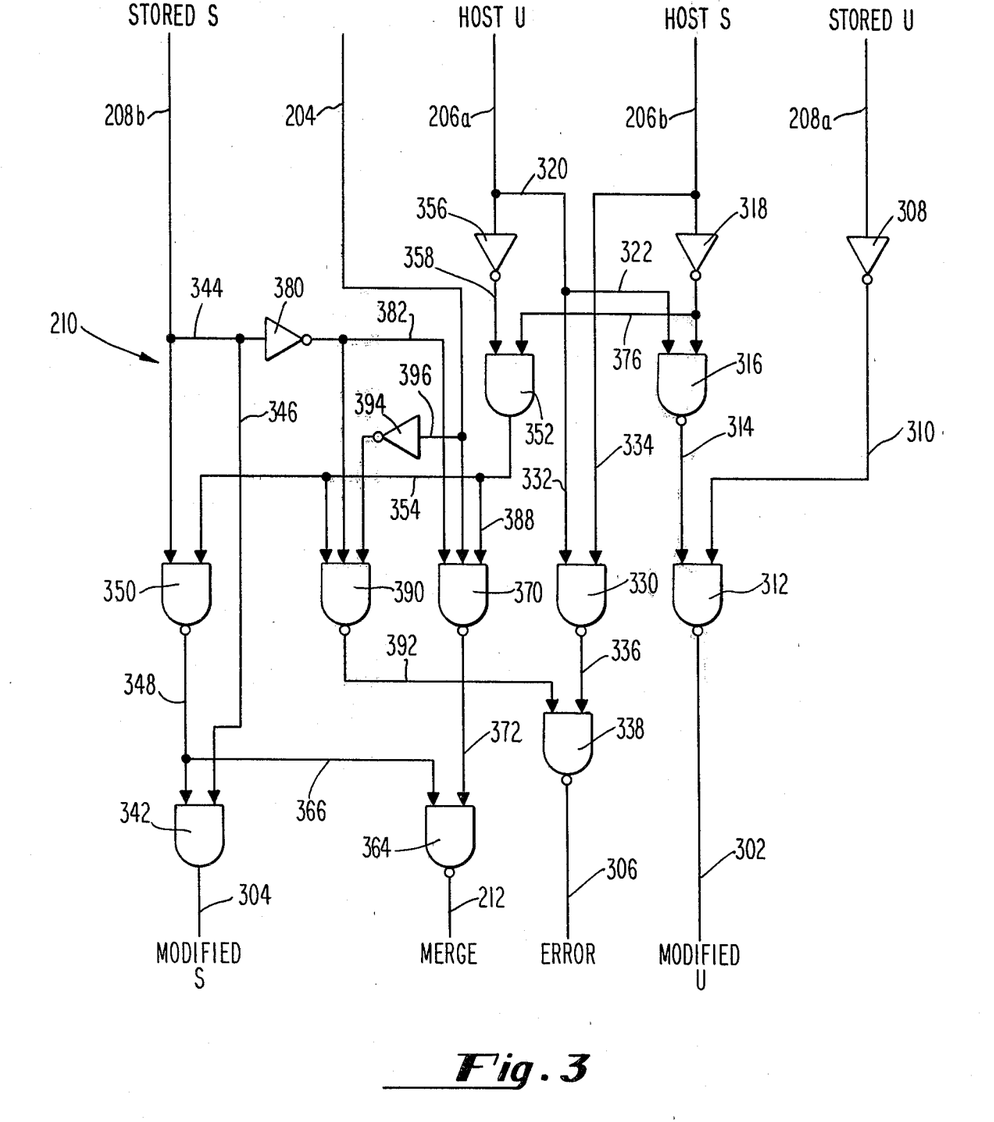
FIG. 3 is a more detailed block diagram of a portion of FIG. 2.

Before describing FIG. 3, let us see how the overprinting circuitry portion 30 of FIG. 2 operates. Our hypothetical line example to be printed is:

My Account Number is M751.

In the hypothetical, this single line requires more than one overprinting operation. For purposes of this example, it will be overprinted in three stages. The first line transmitted from the host system will be, My Account Number is          .

This line represents a statement containing fixed information and leaving a blank region for placing variable information therein, for example, someone's account number. The character positions of the line filled with character shapes alpha-numeric characters will be assigned the control code while the spaces will be assigned 01. See FIG. 5. This host line of data words and associated control bit codes will be merged in the overprint circuitry with a stored line of data. When the last line of data representing information to be printed and stored in the intermediate storage means was transmitted from the intermediate storage means through other parts of the printer for printing, the contents of the intermediate storage means was automatically set to contain data words representing character spaces with no underlining. Accordingly, the hypothetical line will be merged with all spaces. By looking at FIG. 6, we know that every character position in the line from the intermediate storage means will have associated with it the control bit code 01.

As mentioned earlier, for every character position in a line, data word pairs formed from the host line and the stored line will be compared. Under the rules previously described, where a data word for a character shape from the host line is compared with a data word for a space in the stored line, a low data equal signal will be generated on line 204. A low data equal signal along with the control bit codes 00 and 01 for such a pair of data words will be merged in the merge control circuitry 210. It will be recalled that according to the overprint control rule a data word representing a character shape will replace a data word representing a character space. Hence, the merge control signal from the merge control circuitry portion 210 transmitted to the selector 214 will be high. This means that selector 214 will replace each character space in the stored line with a character shape from the host line. The modified control bit code from the merging circuitry portion 210 associated with each selected word will reflect the allowable code for that data word as described in FIG. 6. In this example, the control bit code will be 00.

Where a character space is compared with a character space, the data words and control bit codes are equal and no change occurs to the stored line in these positions. Hence, the output will be a data word for a character space and the associated control bit code will be 01. After the first pass through overprinting circuitry portion 30, the first host line is now stored in the intermediate storage means. Data words for character shapes have the control bit code 00, while the character spaces have the code 01.

The second line of data from the host system will contain the variable data account number to be inserted in the blank region of the first line transmitted. See below.

M751

The second host line will contain data words representing character spaces where the first host line, now the stored line, contained the character shapes in, My Account Number is           . The character space data words in the second host line will be assigned a control bit code 01 as can be seen from FIG. 5. The M751 data will be assigned the control bit codes 00.

The first host line, which is now the stored line, in intermediate storage means 32, will be merged simultaneously with a second host line in the overprinting circuitry means 30. Where the data words in the new host line represent character spaces, they will not replace data words in a stored line and the associated control bit code will remain the same. This is so because a comparison of the control bit codes and the data equal signal from the comparator 202 will not result in a high merge signal being transmitted on line 204 from the merge circuitry portion 210. The same is true where character spaces are compared with character spaces for the two lines. However, at the positions in the two lines where the M751 is compared with the character spaces of the blank region of the stored line, the merge control circuitry will transmit a high merge signal and the selector 214 will select the data words M751. The merge control circuitry will modify the control bit code associated with the character space data words to provide a modified control bit code 00 for the newly selected words. The output of selector 214 is again stored in intermediate storage means 32. The new line of data stored in the intermediate storage means 32 now contains the first line of data including the variable data representing the account number.

The stored line of data now in the intermediate storage means 32 is still not ready for printing. It requires one more overprinting operation where the account number, M751, is underlined. The third line of data from the host system will contain data words representing character spaces but the character positions in the line where the M751 occurs will contain data words indicating that underlining of these character positions are required. The control bit codes assigned to the third host line will be 01 for character spaces not requiring underlining and 10 where underlining is to occur. See FIG. 5. This third host line is simultaneously transmitted to the overprinting circuitry portion 30 along with the stored line in the intermediate storage means 32. For these two lines, no high merge signals will be generated and therefore, all data words transmitted from selector 214 will be the same as the data words contained in the stored line. However, the control bit codes associated with M751 stored line are 00 while the control bit codes associated with the data words in the same positions in the third host line have the code 10. The merge control circuitry portion 210 will respond to these control bit code pairs to generate a modified control bit code, 10. The control bit code 10 will be associated with the M751 data words. As the data words are transmitted from the selector 214 along with the associated control bit codes, they are stored once again in the intermediate storage means 32. However, overprinting is complete and the line of data words will be transmitted to the character generator memory 12 where they will identify starting addresses for the various character shapes to print the line. At the same time, the underscore bit portion of the control bit codes associated with the data words will be transmitted to the printing means 16. Where the underscore portion of the control bit code is high, it will cause the light beam modulator of the printing means to print a line. Since the underscore bit portion is associated with a particular data word which represents a character shape in the character generator memory 12, that particular character shape will be underlined when printed.

Figure 7:
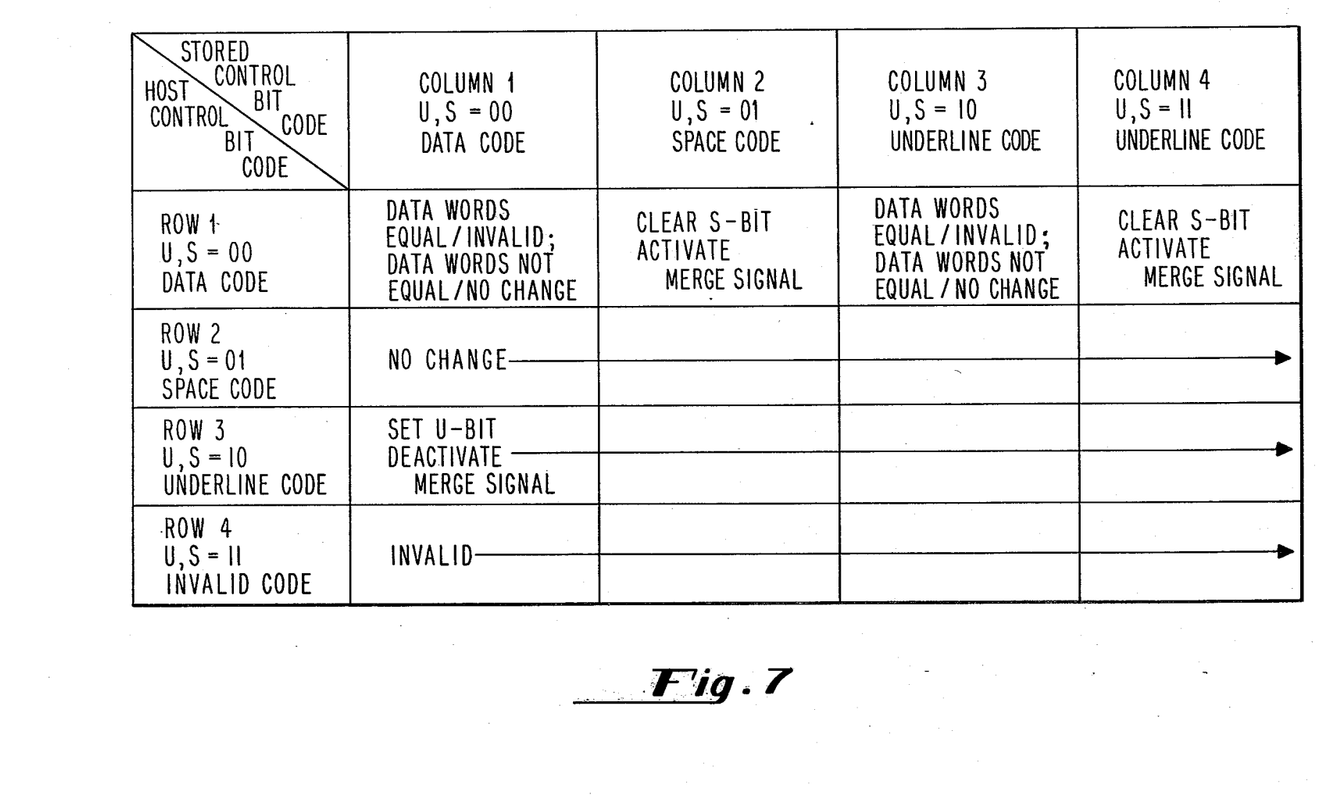
FIG. 7 is a table showing how the control bit codes are modified by the operation of FIG. 3.

FIG. 7 is a table showing how the merge control circuitry portion 210, acting in accordance with the above mentioned overprinting rules, will merge the host and stored lines of data as a function of the control bit code assigned to each data word. The top row describes the possible combinations of the control bit code assigned to a stored data word, and the left most vertical column shows the possible combinations of the control bit code associated with the host data word. By choosing an intersection of row and column, we see how the merge control circuitry portion 210 will operate on the data word pair formed by the row and column entries.

Since the control bit code $U=1$, $S=1$ for host data words is not valid, the bottom row of FIG. 7 indicates that combining host control bit codes of $U=1$, $S=1$ with any control bit code from a stored data word is not valid. The third row of FIG. 7 states that if the host U-bit is high indicating that the associated data word is to be underlined, then a modified U-bit shall indicate a U-bit high. This is true no matter what the control bit code associated with the stored data word is. No high merge signal is present for the third row so that the data word to which the modified control bit code is assigned is the data word from the stored line. Only the U-bit code is modified.

For the second row of FIG. 7, the host control bit code is $U=0$, $S=1$. From FIG. 5 this means that the host data word is a space with no underlining desired. From FIG. 7 we see that when this control bit code for host data word is combined with any of the possible control bit codes of a data word from the stored line, no change in the stored line of data and the associated control bit code is to occur. This means that no high merge signal shall be present from the merge control circuitry portion 210 and no modification shall be made to the control bit codes associated with data words in the stored line. In part, this is an implementation of the rule that no host character space shall replace a stored character shape.

In row one, the host control bit code is $U=0$, $S=0$. This means that the associated data word in the host line is a character shape without underlining. FIG. 7 shows that when this host control bit code is merged with a store control bit code of $U=0$, $S=0$ an invalid operation results if the associated data words are not equal. If they are equal, then no change to the stored data word and control bit code occurs. For the case where the data words are equal, no merge signal is generated and no control bit codes are changed.

When the control bit code $U=0$, $S=0$ is merged with the stored control bit code $U=0$, $S=1$, FIG. 7 tells us that the modified S-bit will be cleared to zero and the merge signal activated to select the host data word. This means that the data word for a character shape from the host line will replace a character space in the stored line. This new data word requires a control bit code which indicates that the associated data word is a character shape. Hence, the modified S-bit is cleared to zero.

Merging of a host control bit code of $U=0$, $S=0$ with a stored control bit code of $U=1$, $S=0$ represents an invalid operation if the data words are not equal. If they are equal, then no change is to occur to the stored data word and associated control bit code as the result of passage through the overprinting circuitry 30.

Finally, when a host control bit code of $U=0$, $S=0$ is merged with a stored control bit code of $U=1$, $S=1$, FIG. 7 tells us that the host data word representing a character shape will replace a stored data word representing a character space. This is accomplished by setting the merge signal to high and modifying the data bit portion to indicate that the associated data word is a character shape, that is, $S=0$.

The merge control circuitry portion 210 is shown in detail in FIG. 3. Merge control circuitry portion 210 accepts a pair of control bit codes for the pair of data words being compared in comparator means 202, and the data equal signal from the comparator means 202. The underscore control bit portion of the storage control bit code (stored U-bit) enters via 208a and the data portion (stored S-bit) enters via 208b. The underscore control bit portion of the host data word (host U-bit) enters via line 206a while the data bit (host S-bit) enters via line 206b. Line 204 contains the data equal signal. These signals represent the inputs to the merge control circuitry portion 210. The outputs are: the modified control bit codes (modified U-bit on line 302 and the modified S-bit on line 304): the merge signal on line 212; and an error signal on line 306.

The modified U-bit is transmitted from NAND gate 312 whose inputs are an inverted stored U-bit via line 310 from inverter 308 and the output from NAND gate 316 via line 314. The inputs to NAND gate 316 are an inverted host S-bit from inverter 318 and a host U-bit via line 120 then line 322.

The modified S-bit on line 304 is transmitted from AND gate 342 whose inputs come from NAND gate 350 and the stored S-bit via lines 208b, 344 and 346. The inputs to NAND gate 150 are the stored S-bit and the output of AND gate 352. The inputs to AND gate 352 are the inverted host U-bit from inverter 356 and the inverted host S-bit from inverter 318.

The merge signal is transmitted from NAND gate 364 via line 212. The inputs to NAND gate 364 are the output of NAND gate 350 via lines 348 and 366 and the output of NAND gate 370. The inputs to NAND gate 370 are: the stored S-bit on line 208b inverted by inverter 380 and transmitted via line 382; the data equal signal from line 204; and the output of AND gate 352.

To see how the circuitry of FIG. 3 described in part above implements the merge operations of FIG. 7, we should first look at the third row of FIG. 7 where the control bit codes of the host data word are $U=1$, $S=0$. According to FIG. 7, the circuitry of FIG. 3 should set the modified U-bit to one and the merge signal to zero. The modified S-bit should be the same as the stored S-bit on line 208b. A high signal on line 206a will be transmitted as a high signal to NAND gate 316. The low signal on line 206b will be inverted by inverter 318 to provide a second high signal to NAND gate 316. Two high signals to NAND gate 316 result in a low signal over line 314 to NAND gate 312. A low signal input to NAND gate 312 provides a high modified U-bit signal over line 302. Hence, a control bit code for a host data word $U=1$, $S=0$ results in a high modified U-bit. Although this is identified as a modified bit, it is not actually changed in this example. Now we must look at the output on line 212, the merge signal. Since the host control bit codes are not the same, that is $U=1$ and $S=0$, the output of AND gate 352 will be low. A low signal to NAND gate 370 will provide a high output on 372 regardless of the other inputs to NAND gate 170. NAND gate 364 receives the high input on line 372 and before NAND gate 364 can be fully enabled, we must look at the other input on line 366. This input comes from NAND gate 350. However, one of the inputs to NAND gate 350 is the output of AND gate 352 which is low for the host control bit code under consideration. A low signal to NAND gate 350 will provide a high signal over line 366 to NAND gate 364. Hence, two high signals are furnished to NAND gate 364 which results in a low merge signal.

FIG. 7 tells us in row two that when a host control bit code is U=0, S=1, then the modified U and S-bits will be the same as the stored U and S-bits and the merge signal on line 212 will be low. First we will investigate the low merge signal 212. Since the U and S-bits are again different, the operation of the circuitry leading to a merge signal on line 212 is the same as the description given above for host control bit codes of U=1, S=0. This is true since AND gate 352 will provide low signals to both NAND gates 370 and NAND gate 350. Low signals to these NAND gates will provide high signals to NAND gate 364 which will furnish a low output signal which is the merge signal on line 212. Inspection of the circuitry of FIG. 3 will demonstrate that for a host control bit code of U=0, S=1, the modified U and modified S-bits will be the same as the stored U-bit on line 208a and the stored S-bit on line 208b.

Before showing how the merge control circuitry of FIG. 3 implements the remaining portions of FIG. 7, it will be necessary to describe the error circuitry present in FIg. 1. The host control bit codes, the U-bit signal on line 206a and the S-bit signal on line 206b, are both provided to NAND gate 330. NAND gate 330 provides an output to NAND gate 338. NAND gate 338, in turn, provides an error signal over line 306. The remaining input to NAND gate 338 comes from NAND gate 390 over line 392. NAND gate 390 receives three inputs as follows: the output of AND gate 352; the inverted output of the data equal signal inverted by inverter 394; and the inverted stored S-bit inverted by inverter 380.

FIG. 7 tells us in the bottom row that whenever the host control bit code is U=1, S=1 then the invalid operation results. When two high signals are provided over lines 332 and 334 to NAND gate 330, a low output is provided over line 336 to NAND gate 338. A low signal to NAND gate 338 will result in a high signal on line 306. This high signal on line 306 is the error signal indicating that an unrecognized host data word has been transmitted.

From FIG. 7, in the top row, we see that an invalid operation results if the data words are not equal and the associated control bit codes for the data words being compared are both U=0, S=0. In such a situation, the output of AND gate 352 will be high because of the inverters 356 and 318. This high signal is transmitted to NAND gate 390. Similarly, the stored S-bit on line 208b is low and is inverted by inverter 380 to provide a high signal to NAND gate 390. Finally, since the data words being compared are not equal, a low signal on line 204 is inverted by inverter 394 and transmitted as a high signal to NAND gate 390. Hence, NAND gate 390 receives three high inputs and provides a low signal on line 392 to NAND gate 338 which, in turn, provides a high error output signal on line 306. If the data words are equal, then NAND gate 390 is disabled and no error signal results. At the same time, inspection of the circuitry of FIG. 3 will show that the modified U and S-bits will both be low.

An interesting combination arises in row one, where the control bit code for the host data word is U=0, S=0 and the control bit code for the stored data word is U=0, S=1. Since the host data word represents a character shape, we want the merging circuitry portion 210 to provide a high merge signal to selector 214 so that the data word from the host line replaces the data word on the stored line. The modified U and S-bits should be zero and zero, respectively. Inspection of FIG. 3 shows that both bits of the host control bit code are inverted by inverters 356 and 318 and provided to AND gate 352. Since both bits of the host control bit code are low, AND gate 352 will transmit a high signal to NAND gate 350. The other input to NAND gate 350 is also high since it is the stored S-bit on line 208b. Hence, NAND gate 350 transmits a low signal to NAND gate 364 which, in turn, provides a high merge signal, the desired result. We also want the modified S-bit to be low. However, the output of NAND gate 350 is low as we have just seen and this output is provided to AND gate 342. Therefore, the output of AND gate 342 will be low and this is the modified S-bit signal.

Another invalid operation occurs in row one when the host control bit code (00) is merged with the stored control bit code (10) and the data words of the associated pair are not equal. The two low signals on lines 206a and 206b are furnished to NAND gate 330 which provides a high signal on line 336 to NAND gate 338. The low data equal signal on line 204 is inverted by inverter 394 and furnished to NAND gate 390. The high signal from AND gate 352 is also furnished to NAND gate 390. The stored S-bit, which was low provides another high signal to NAND gate 390 because of inverter 380. NAND gate 390 sees three high inputs and provides a low input on line 392 to NAND gate 338. This provides a high error signal out. If the data words are not equal then no error signal is provided by NAND gate 338. Inspection of the circuitry of FIG. 3 will show that the modified U and S-bits are the same as the stored U and S-bits when this occurs.

When a host control bit code of 00 is merged with a stored control bit code of 11, as in row one, it is required that the host data word replace the stored data word and that the modified S-bit be provided as a low signal while the U-bit provided as a high signal. This results in a character shape replacing a character space and maintaining the underlining requirement for the associated data word. Circuitry of FIG. 3 accomplishes this in the following way: the stored S-bit is high and is provided to NAND gate 350. The output of AND gate 350 is also high and is provided to NAND gate 350. Two high signals to NAND gate 350 provides a low signal to NAND gate 364 which, in turn, provides a high merge signal on line 212. In addition, the low signal from NAND gate 350 is provided to AND gate 342 causing it to provide a low modified S-bit signal on line 304.

While the present invention has been disclosed in connection with the preferred embodiment thereof, it should be understood that there may be other embodiments which fall within the spirit and scope of the invention that is defined by the following claims.

What is claimed is:

1. A system, to be used with a non-impact printer and a source of data words, to effect overprinting comprising, in combination:
   control bit code generating means connected to receive data words from said source of data words and formed to generate control bits indicating whether a data word with which said control bits would be associated is a character shape or space or needs to be underlined when printed;
   intermediate data word storage means formed to hold data words which will ultimately be printed;

overprinting circuitry means connected to receive second data words and control bits from said control bit generating means and connected to receive first data words and control bits from said intermediate data word storage means to compare said first and second data words and associated control bits to effect a selective merger of said data words and a selected modification of said control bits, and, further, connected to transmit said merged data words and modified control bits back to said intermediate data word storage means whereby certain data words from said second data words may replace certain data words from said first data words and whereby certain modified control bits cause certain data words to be underlined when printed.

2. The invention of claim 1 wherein said non-impact printer comprises:
  a character generator memory for storing a plurality of character shapes, each character shape having a starting address associated therewith;
  a printing means for printing said character shapes when addressed; and
  wherein said control bits associated with a data word comprises: an underline bit which indicates whether said data word requires underlining when printed; and a data bit indicating whether said data word is a character shape or a character space; and
  wherein said underline bit is transmitted to said printing means when said associated data word is transmitted to said character generator means to identify a character shape for printing, whereby selected character shapes are underlined when printed.

3. An overprinting apparatus in a laser non-impact printer, said printer connected to a host system, said host system transmitting lines of data words to said printer for printing, said data words representing character shapes, spaces and underlining requirements for said character shapes and spaces, said overprinting apparatus comprising:
  assignment means connected to said host system for assigning a control bit code to each data word, said control bit code identifying an associated data word as a character shape or a character space and identifying the underlining requirements of said associated data word;
  intermediate storage means for storing a line of data words and associated control bit codes for overprinting;
  overprinting means connected to said intermediate storage means by first input circuitry and by storage output circuitry and connected to said assignment means by second input circuitry, said overprinting means for overprinting said stored line of data words and associated control bit codes received over said first input circuitry with said line of data words and associated control bit codes from said assignment means received simultaneously over said second input circuitry, and for transmitting said overprinted line of data words and associated overprinted control bit codes to said intermediate storage means, said overprinting means further comprising:
    comparing means connected to said first and second input circuitries for comparing a pair of data words for equality, said pairs of data words comprising one data word from said stored line and one data word from said line transmitted from said assignment means, said comparing means transmitting a data equal signal in response to said comparisons;
    merging control circuitry, connected to said first and second input circuitries, said storage output circuitry, and said comparing means, for generating an overprinted control bit code for each of said overprinted data words and for generating a merge control signal for each comparison of a data word pair, said merge control circuitry operating in response to said pair of control bit codes associated with said pair of data words being compared and said merging signal in accordance with a predetermined set of overprint rules, each of said overprinted control bit codes being transmitted to said intermediate storage means over said storage output circuitry; and
    selection means connected to said first and second input circuitries, said storage output circuitry and said merging control circuitry for selecting one of said data words of said data word pair being compared in response to said merge control signal, said selected data words being transmitted to said intermediate storage means over said storage output circuitry with associated overprinted control bit codes.

4. A method of overprinting in a laser non-impact printer, comprising:
  transmitting a plurality of data words from a source of data words;
  generating at least a pair of control bits to be associated with each of said data words, said control bits identifying whether said associated data word is a character shape, a character space, or needs to be underlined when printed;
  storing data words and associated control bits for overprinting before ultimately being printed;
  merging selectively data words that have been stored with new data words from said source of data words and selectively modifying the control bits of said merged data words in accordance with preselected overprint rules; and
  transmitting said merged data words and said associated modified control bits to said intermediate storage means.

5. The method of claim 4, wherein said non-impact printer includes a character generator memory for storing a plurality of character shapes, each of said character shapes having a starting address associated therewith; and a printing means for printing of said character shapes when addressed; and wherein said step of generating control bits includes generating an underline bit which identifies the underlining requirements of said associated data word; and a data bit which identifies said associated data word as a character shape or a character space; and wherein said method further comprises the step of transmitting said stored data words to said character generator memory then transmitting said associated underline bit to said printing means when overprinting of said stored data words are finished, whereby selected character shapes are underlined when printed.

* * * * *